US007396013B2

(12) United States Patent
Ito et al.

(10) Patent No.: US 7,396,013 B2
(45) Date of Patent: Jul. 8, 2008

(54) LOTTERY DEVICE

(75) Inventors: Masato Ito, Tokyo (JP); Yuji Shimada, Tokyo (JP); Makoto Tanaka, Tokyo (JP); Naoki Kawajiri, Tokyo (JP)

(73) Assignee: Sega Corporation (JP)

( * ) Notice: Subject to any disclaimer, the term of this patent is extended or adjusted under 35 U.S.C. 154(b) by 541 days.

(21) Appl. No.: 11/200,053

(22) Filed: Aug. 10, 2005

(65) Prior Publication Data

US 2006/0046837 A1 Mar. 2, 2006

(30) Foreign Application Priority Data

Aug. 31, 2004 (JP) ............................ 2004-253448

(51) Int. Cl.
*A63F 7/04* (2006.01)
*A63F 13/00* (2006.01)

(52) U.S. Cl. ...................................................... 273/144

(58) Field of Classification Search ................... 463/17; 273/138.3

See application file for complete search history.

(56) References Cited

FOREIGN PATENT DOCUMENTS

JP 7-30044 7/1995

*Primary Examiner*—John M. Hotaling, II
*Assistant Examiner*—Jeffrey Wong
(74) *Attorney, Agent, or Firm*—Dickstein Shapiro LLP

(57) ABSTRACT

A lottery device has a turntable 12 with a plurality of ball pockets 13 and balls 2 each to be dropped onto the turntable 12, rolls on the turntable 12 and eventually falls into one of the ball pockets 13 to determine a winner ball pocket 13. The lottery device includes sets of sensors 24 and 25 combined with the ball pockets 13, respectively, to detect the ball that has fallen into the corresponding ball pocket 13, light-emitting rings 23 combined with the ball pockets 13, respectively, a ball identifying mechanism 41 for identifying the balls by type, and a computer 100 including a storage unit storing control programs and controlling lottery operations according to the control programs. The computer 100 executes a control procedure including the steps of: determining a color, indicating the type of the ball identified by the ball identifying mechanism 41, in which the light-emitting ring 23 emits light according to a control program, receiving detection signals provided by the sensors 24 and 25 combined with the ball pocket 13 into which the ball 2 has fallen, and causing the light-emitting ring 23 combined with the ball pocket 13 into which the ball has fallen to emit light in the predetermined color. The lottery device engrosses the players by effectively making the light-emitting rings 23 emit light according to the state of the lottery game to appeal the functions of the ball pockets 13 to the players.

9 Claims, 13 Drawing Sheets

LOTTERY DEVICE

BACKGROUND OF THE INVENTION

1. Field of the Invention

The present invention relates to a lottery device having a table provided with a plurality of openings to determine winners by receiving balls in the openings.

2. Description of the Related Art

Lottery devices of this type include roulette game devise and bingo game devices. A known bingo game device is disclosed in Japanese Utility Model Publication No. 7-30044.

The bingo game device disclosed in Japanese Utility Model Publication No. 7-30044 includes a turntable including a rotating disk provided with a plurality of ball pockets for receiving a ball, and a plurality of balls of different colors. The plurality of ball pockets of the rotating disk are numbered randomly by serial numbers, respectively.

The ball pockets of the rotating disk are simple round openings and do not appeal their functions to the players. Thus, the ball pockets do not have attractive effects that engross the players in the game.

The present invention has been made in view of such circumstances and it is therefore an object of the present invention to provide a lottery device including a table provided with openings and light-emitting means disposed near the openings, and capable of engrossing players in a lottery game by most effectively causing the light-emitting means to emit light according to the state of the lottery game to appeal the functions of the openings in the lottery game to the players.

SUMMARY OF THE INVENTION

A lottery device in a first aspect of the present invention having a table with a plurality of openings, balls to be rolled on the table, and lottery means for detecting the ball that has fallen into the opening includes: ball detecting means combined with the openings, respectively, to provide a detection signal upon detection of the ball that has fallen into the opening; light-emitting means combined with the openings, respectively, to emit light of different colors; a ball identifying mechanism for identifying the balls by type; and control means including a storage unit storing control programs and controlling lottery operations according to the control programs; wherein the control means includes color determining means for determining a color of light indicating the type of the ball identified by the ball identifying mechanism to be emitted by the light-emitting means according to the control program, and light-emitting means driving means for driving the light-emitting means when the ball rolling on the table falls into the opening combined with the light-emitting means such that the light-emitting means emits light in the color determined by the color determining means.

When the ball rolling on the table falls into one of the openings, the ball detecting means detects the ball, and the light-emitting means combined with the opening into which the ball has fallen emits light of a color indicating the type of the ball that has fallen into the opening and determined according to the control program. Such a light-emitting mode has a strong attractive effect on the player, the light-emitting means emits light most effectively according to the state of the lottery game to appeal the functions of the openings in the lottery game to the players and to engross the players in the lottery game.

The ball may have any shape, provided that the ball can roll. The ball may be, for example, an ellipsoidal ball resembling a ball for rugby football game or a polyhedral ball resembling a dice, not to speak of a spherical ball.

A lottery device in a second aspect of the present invention having a table with a plurality of openings, balls to be rolled on the table, and lottery means for detecting the ball that has fallen into the opening includes: a ball dropping mechanism for dropping the ball onto the table; a ball recovering mechanism for recovering the balls that has fallen into the openings; a ball identifying mechanism for identifying the balls recovered by the ball recovering mechanism by type; a ball sorting mechanism for sorting the balls identified by the ball identifying mechanism by type and holding the sorted balls; a ball selecting mechanism for selectively delivering the balls sorted and held by the ball sorting mechanism to the ball dropping mechanism; ball detecting means combined with the openings, respectively, to provide a detection signal upon the detection of the ball that has fallen into the opening; light-emitting means combined with the openings, respectively, to emit light of different colors; control means including a storage unit storing control programs and controlling lottery operations according to the control programs; wherein the control means includes: color determining means for determining a color indicating the type of the ball identified by the ball identifying mechanism for light to be emitted by the light-emitting means according to the control program, a ball selecting mechanism operating means for operating the ball selecting mechanism so as to select the ball of a type corresponding to the color determined by the color determining means from the balls sorted and held by the ball sorting mechanism and to deliver the selected ball to the ball dropping mechanism, ball dropping mechanism operating means for operating the ball dropping mechanism so as to drop the ball delivered to the ball dropping mechanism onto the table, and light-emitting means operating means for operating the light-emitting means combined with the opening into which the ball has fallen in response to a detection signal provided by the ball detecting means combined with the opening into which the ball fallen so as to cause the light emitting means to emit light of the determined color.

The color indicating the type of the ball identified by the ball identifying means, to be emitted by the light-emitting means is determined according to the program, the ball of the type indicated by the determined color is selected from the balls sorted by type and held by the ball sorting mechanism, the selected ball is delivered to the ball dropping mechanism, the ball delivered to the ball dropping mechanism is dropped onto the table, and the light-emitting means combined with the opening emits light of the color indicating the type of the ball when the ball falls into the same opening.

Thus, the lottery device of the present invention is capable of engrossing players in a lottery game by most effectively making the light-emitting means emit light according to the state of the lottery game to appeal the functions of the openings in the lottery game to the players.

The ball recovering mechanism recovers the balls that has fallen into the openings of the table, the ball identifying mechanism identifies the balls by type and the ball sorting mechanism sorts the recovered balls by type and holds the sorted balls. Thus, the balls are circulated, new balls do not need to be continuously supplied and hence the lottery device operates efficiently.

In the lottery devices in the first and the second aspect of the present invention, each of the balls is internally provided with an IC tag storing identification information about the type of the ball and capable of sending and receiving signals by the agency of electromagnetic induction, and The ball identifying means is provided with an antenna for sending signals to and receiving signals from the IC tag of the ball and deciphering means for deciphering identification information received through the antenna to discover the type of the ball.

The ball identifying means receives the identification information recorded on the IC tag placed in the ball through the antenna in a noncontact mode and the deciphering means deciphers the identification information to discover the type of the ball. The type of the ball typified by an attribute, such as color, size, shape or material, can be determined and the balls identical in attribute can be discriminated from each other. Thus, the lottery device can be applied to various lottery games.

The ball identifying mechanism may be provided with an inclined duct, along which the ball rolls, with which the antenna is combined, a stopper capable of temporarily stopping the ball rolling down along the duct near the antenna and of rolling the ball, and stopper driving means for driving the stopper.

The stopper stops temporarily the ball rolling down along the inclined duct near the antenna and the antenna receives the identification signal from the IC tag placed in the ball. In some cases, the antenna is unable to communicate with the IC tag if the ball is held in an improper position relative to the antenna. Since the stopper is capable of turning the ball, the IC tag can be set in various positions. Consequently, the antenna is able to communicate with the IC tag to receive the identification information.

The stopper may be a rotating disk provided with a recess capable of loosely receiving the ball therein to move the ball, and the stopper driving means is capable of turning the rotating disk about an axis of the rotating disk.

The ball rolling down along the inclined duct can be temporarily stopped near the antenna by the circumference of the rotating disk, and the ball in contact with the circumference of the rotating disk can be turned by slightly turning the rotating disk to change the position of the IC tag placed in the ball. Thus the identification information can be surely received through the antenna. The rotating disk is able to move the balls one by one by turning after loosely receiving the ball in the recess.

Preferably, each of the balls is made of a transparent or translucent material and has an opaque core, the ball detecting means includes at least two infrared sensors respectively using infrared rays for detecting the ball that has fallen into the opening, and the infrared sensors are disposed such that the infrared rays travel respectively in different directions across the opening.

When the ball falls into the opening, the light-emitting means combined with the opening emits light. The ball made of the transparent or translucent material and having the opaque core transmits and reflects the light emitted by the light-emitting means. Consequently, the glittering ball produces an amusing effect.

In some cases, an optical sensor serving as the ball detecting means is unable to detect the ball that has fallen into the opening because the ball is made of the transparent or translucent material. The ball can be surely detected by the two or more infrared sensors respectively emitting infrared rays in different directions.

A lottery device in a third aspect of the present invention, having a table with a plurality of openings, balls to be rolled on the table, and lottery means for detecting the ball that has fallen into the opening includes: ball detecting means combined with the openings, respectively, to provide a detection signal upon the detection of the ball that has fallen into the opening; light-emitting means combined with the openings, respectively, to emit light of different colors; lottery monitoring means for monitoring a state of a lottery game on the basis of results of operation of the ball detecting means; light-emitting means selecting means for selecting the light-emitting means to emit light according to a specific lottery state; color determining means for determining a color for light to be emitted according to a specific lottery state; and light emission control means for causing the light-emitting means selected by the light-emitting means selecting means according to a specific lottery state detected by the lottery state monitoring means to emit light of the color determined by the color determining means in the specific lottery state.

In a specific lottery state calling a special attention among lottery states determined on the basis of results of operation of the ball detecting means, the light-emitting means selected by the light-emitting means selecting means according to the specific lottery state emits light of the luminescent color determined by the luminescent color determining means. Consequently, the openings are able to appeal their functions in the lottery game to the players to engross the players in the lottery game.

Preferably, the lottery device further includes a plurality of lottery game terminals to be operated by a plurality of players simultaneously participating in the lottery game, the lottery state monitoring means monitors the respective lottery states of the lottery game terminals on the basis of results of detecting operations of the ball detecting means, and the color determining means assigns predetermined colors beforehand to the lottery game terminals, respectively.

The light-emitting means selected by the light-emitting means selecting means according to a specific lottery state emits light in the specific color assigned to the lottery game terminal in a specific lottery state. Therefore, the player operating the same lottery game terminal is able to know easily that the player is in the specific lottery state from the color of the light emitted by the light-emitting means and the player can be more enthusiastically absorbed in the lottery game.

Preferably, the specific lottery state is a state in which the ball is needed to fall into the specific opening, and the light-emitting means selecting means selects the light-emitting means combined with the specific opening in the specific lottery state.

In the specific lottery state in which the ball is needed to fall into the specific opening, the light-emitting means combined with the specific opening emits light. Thus the light-emitting means combined with the opening calling a particular attention emits light to facilitate the recognition of the specific opening by the player and the player can be more enthusiastically absorbed in the lottery game.

A lottery device in a fourth aspect of the present invention having a table with a plurality of openings, balls to be rolled on the table, and lottery means for detecting the ball that has fallen into the opening includes: ball detecting means combined with the plurality of openings, respectively, to detect the ball that has fallen into the opening; display means combined with the openings, respectively, to display an image, such as characters or patterns; a lottery state monitoring means for monitoring a state of a lottery game on the basis of results of detecting operations of the ball detecting means; display selecting means for selecting the display means to display an image indicating a specific lottery state; image determining means for determining an image to be displayed to indicate the specific lottery state; and display control means for causing the display means selected by the display means selecting means to display the image determined by the image determining means in the specific lottery state.

In a specific lottery state calling a special attention among lottery states determined on the basis of results of the detecting operations of the ball detecting means, the display means selected according to the specific lottery state by the display means selecting means displays the image determined by the image determining means. The display means displays images most effectively according to lottery state. Consequently, the functions of the openings in the lottery game can be effectively appealed to the players by the images and the players can be engrossed in the lottery game.

DESCRIPTION OF THE PREFERRED EMBODIMENTS

Preferred embodiments of the present invention will be described with reference to FIGS. 1 to 14.

A lottery device 10 in a preferred embodiment of the present invention is applied to a bingo game machine 1, namely, a commercial medal game machine.

Figure 1:
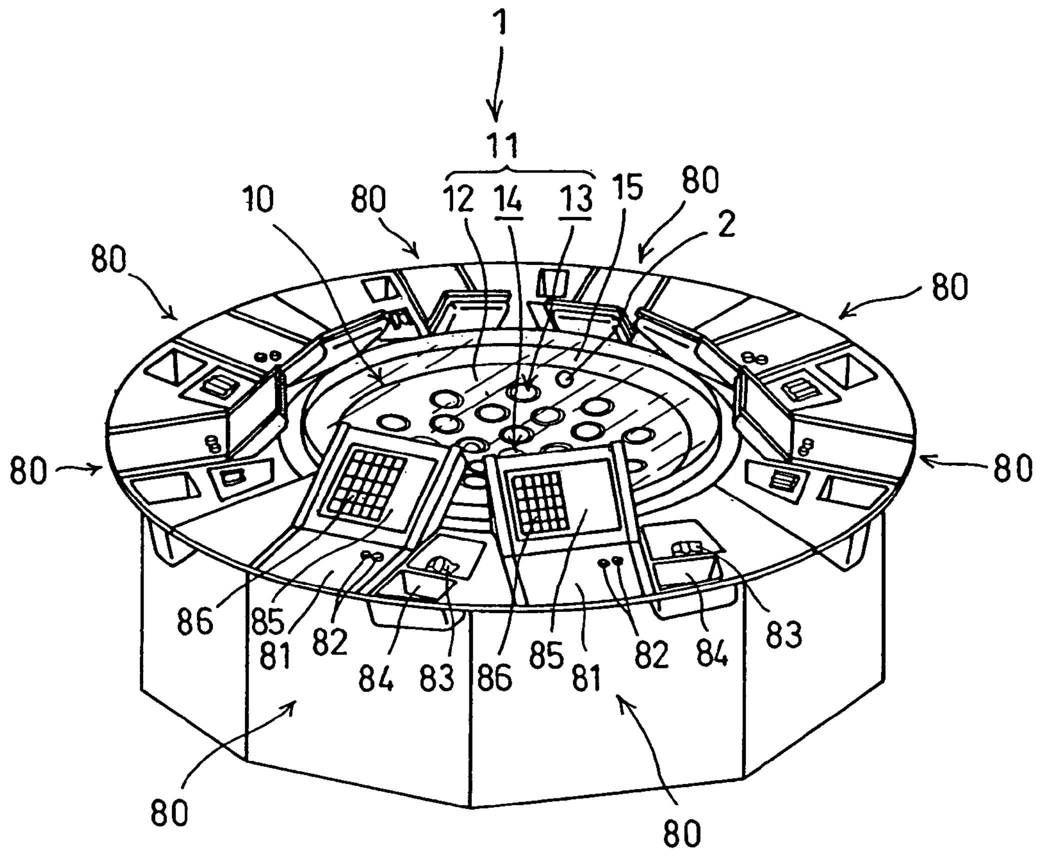
FIG. 1 is a general perspective view of a bingo game machine in a preferred embodiment of the present invention.

Referring to FIG. 1 showing the bingo game machine 1, a turntable mechanism 11 included in the lottery device 10 is disposed in the central part of the bingo game machine 1, and, for example, eight satellite units 80 are arranged around the turntable mechanism 11. Players operate the satellite units 80 to play the game. The eight satellite units 80 are colored in different colors, respectively.

The central turntable mechanism 11 has an upward concave turntable 12 of a shape resembling an inverted right circular cone having a large vertex angle. The turntable 12 is provided with, for example, twenty-five ball pockets 13 and one blank pocket 14. A ball 2 dropped onto the rotating turntable 12 rolls on the surface of the turntable 12 and falls in one of the ball pockets 13 or in the blank pocket 14 for lottery. The turntable 12 is covered with a transparent plate 15.

Each satellite unit 80 is provided with a console 81 with a liquid crystal display 85, namely, a display means. The console 81 is provided with control buttons 82, a medal slot 83 and a medal payoff return 84. The liquid crystal display 85 displays a bingo grid 86 provided with numbers 1 to 25 marked in twenty-five squares arranged in five rows and five columns and information about the bingo game. The numbers 1 to 25 are randomly arranged.

Figure 2:
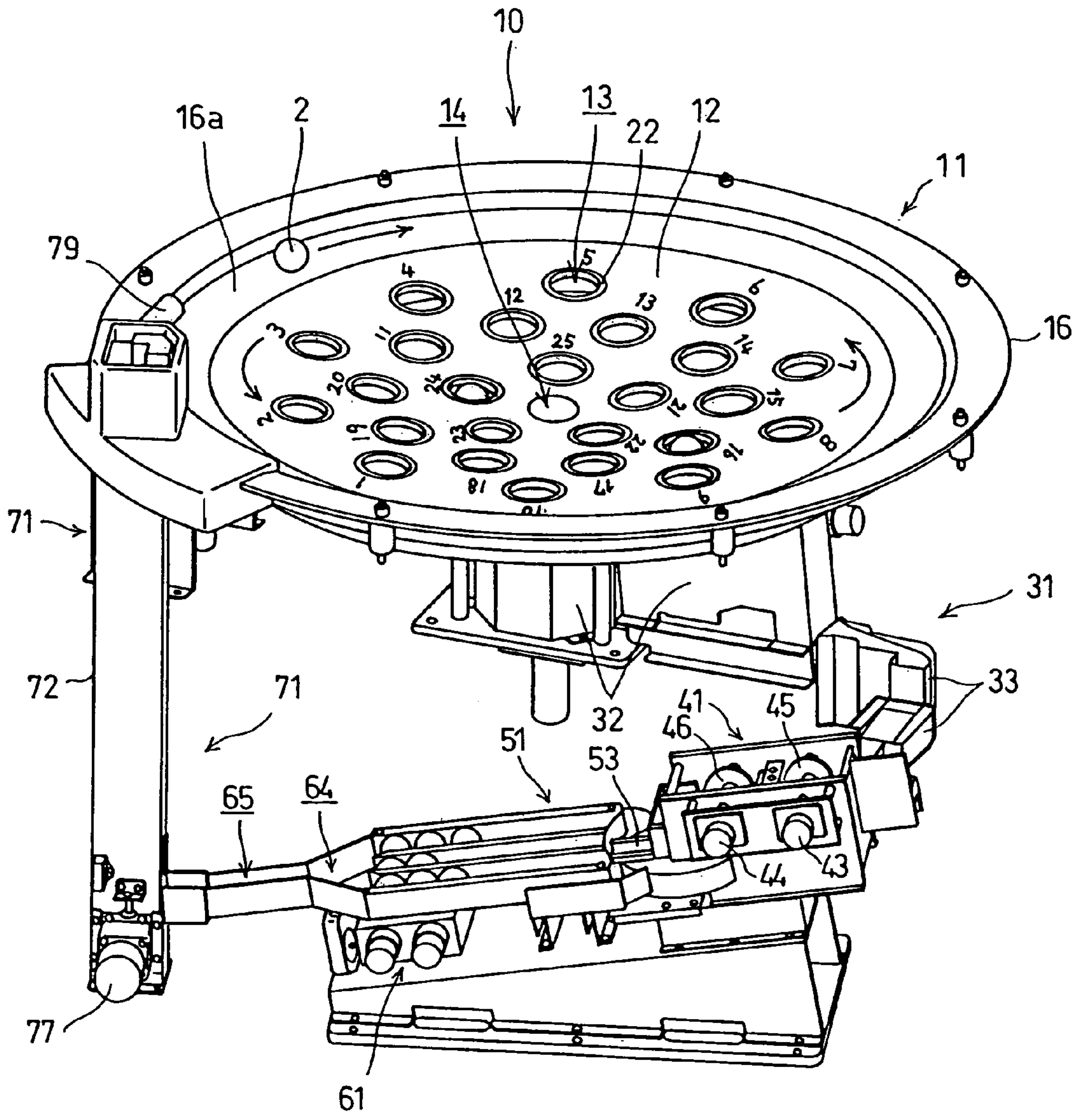
FIG. 2 is a perspective view of an essential part of the bingo game machine shown in FIG. 1.
Figure 3:
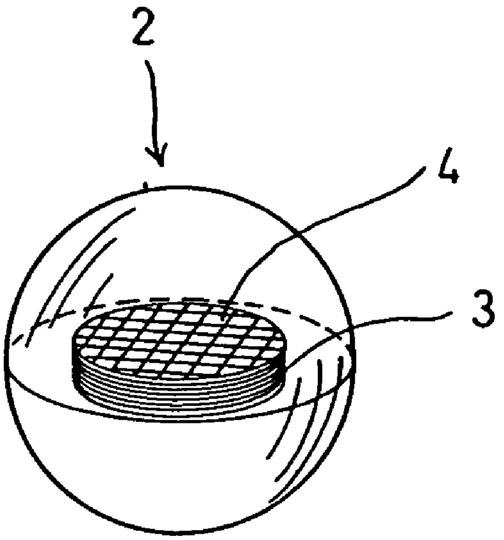
FIG. 3 is a perspective view of a ball, showing the construction of the ball.

Referring to FIG. 2 showing the lottery device 10, a ball recovering mechanism 31, a ball identifying mechanism 41, a ball sorting mechanism 51, a ball selecting mechanism 61 and a ball dropping mechanism 71 are disposed under the turntable mechanism 11.

The balls 2 are spherical objects made of red, green and yellow translucent resins (R, G and Y translucent resins), respectively. Each of the balls 2 is internally provided with a disk-shaped IC tag 3. The IC tag 3 is a miniature storage medium. Information identifying the ball 2 can be recorded on the IC tag 3. In this embodiment, information identifying the color of the ball 2 is recorded on the IC tag 3.

The IC tag 3 is provided with three coils perpendicularly intersecting each other for noncontact wireless communication with the ball identifying mechanism 41. Signals are exchanged between the coils of the IC tag 3 and an antenna 48 (FIG. 7) included in the ball identifying mechanism 41 by electromagnetic induction. Reflective sheets 4 are attached to the two opposite surfaces of the IC tag 3.

Figure 4:
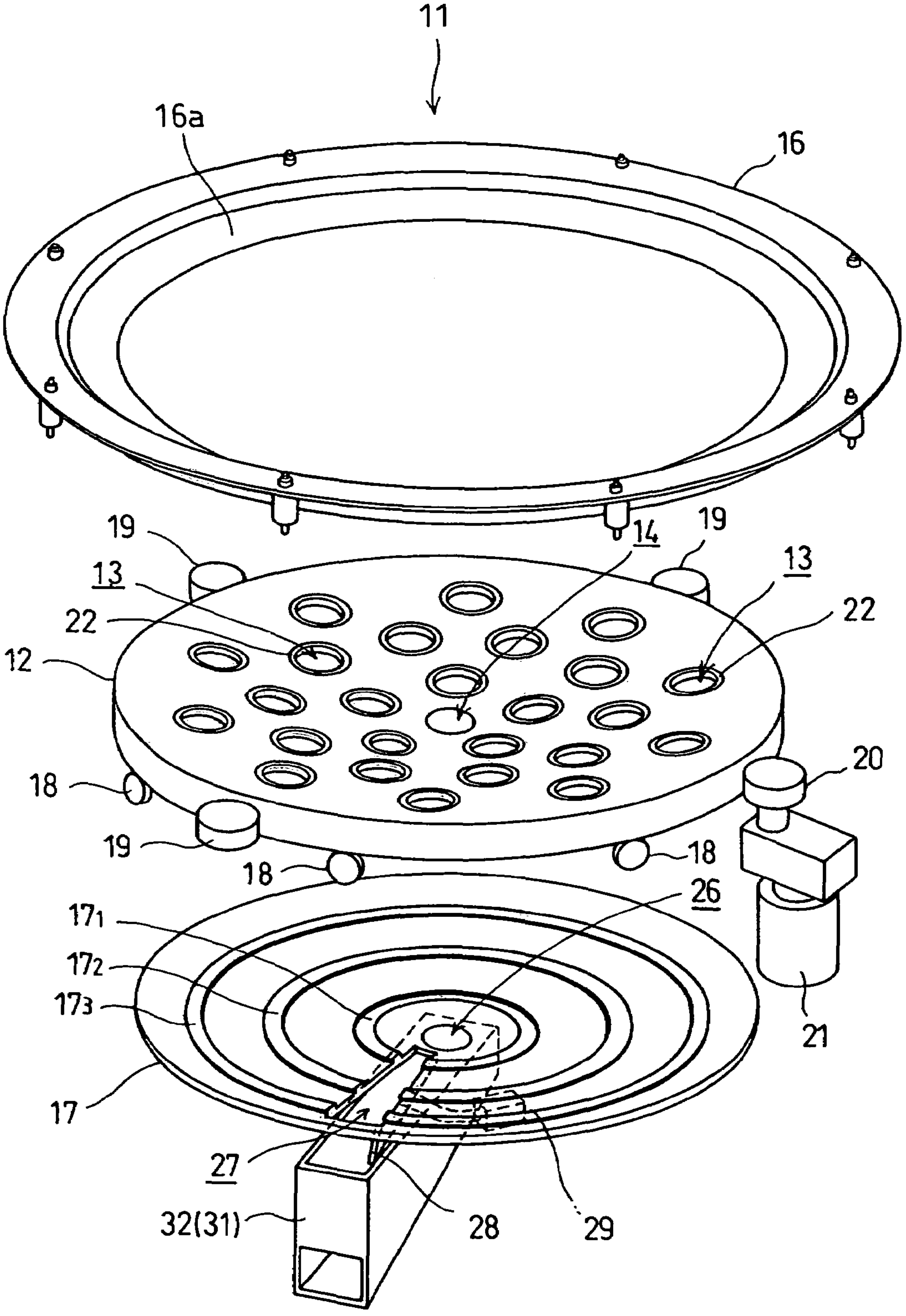
FIG. 4 is an exploded perspective view of a turntable mechanism.

Referring to FIG. 4 showing the turntable mechanism 11 in a perspective view, a fixed circular guide plate 16 surrounds the turntable 12. A stationary disk 17 is disposed under the turntable 12 so as to extend along the lower surface of the turntable 12.

The turntable 12 is supported on a plurality of rollers 18. Three idle rollers 19 and one drive roller 20 are set in contact with the circumference of the turntable 12 to position the turntable 12. The drive roller 20 is driven for rotation by a motor 21 to rotate the turntable 12. The rollers 18, the three idle rollers 19, the drive roller 20 and the motor 21 constitute a table rotating mechanism.

The blank pocket 14 is formed in a central part of the turntable 12. The twenty-five ball pockets 13 are arranged on three circles having their centers at the center of the turntable 12. The numbers 1 to 25 randomly assigned to the ball pockets 13 are marked at positions near the ball pockets 13.

Figure 5:
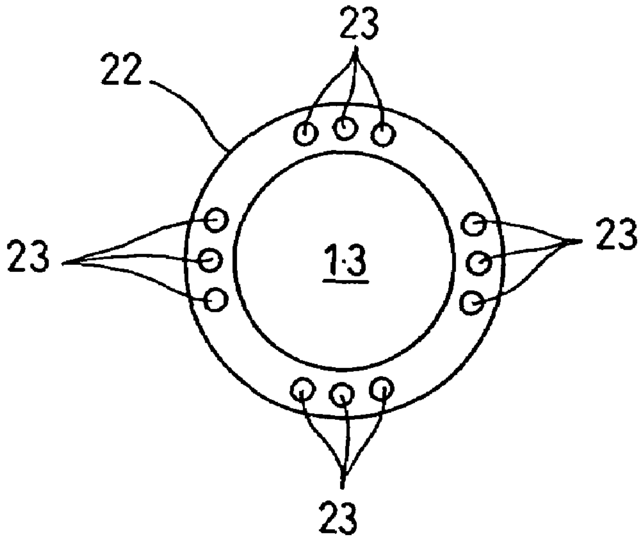
FIG. 5 is a plan view of a light-emitting ring.

Referring to FIG. 5, a translucent light-emitting ring 22 is fitted in each of the ball pocket 13. The light-emitting ring 22 is provided with four sets of LEDs 23. The LEDs 23 are built into the light-emitting ring 22. The LEDs of each set are red, green and yellow LEDs (R, G and Y LEDs). The R, G and Y LEDs 23 are selectively driven to illuminate the light-emitting ring 22 in a desired one of a plurality of colors.

Figure 6:
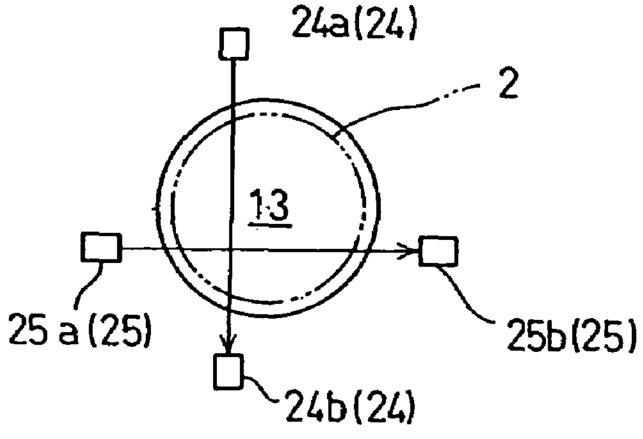
FIG. 6 is a diagrammatic view explaining infrared sensors.

As shown in FIG. 6, two transmission infrared sensors 24 and 25 are disposed under the light-emitting ring 22. The infrared sensor 24 includes a projector **24*a* and a receiver 24*b*. The infrared sensor 25 includes a projector 25*a* and a receiver 25*b*. The two infrared sensors 24 and 25 are disposed such that infrared rays projected by the projectors 24*a* and 24*b* intersect perpendicularly each other at a position not corresponding to the center of the ball pocket 13. The infrared sensors 24 and 25 detect the translucent ball 2 that has fallen into the ball pocket 13. Thus, each ball pocket 13 is provided with the light-emitting ring 22 with the built-in LEDs, and the infrared sensors 24 and 25 for detecting the ball 22 that has fallen into the ball pocket 13**.

The stationary disk 17 disposed under the turntable 12 has an upward concave conical shape resembling the shape of the turntable 12. Circular ball support bands $17_1$, $17_2$ and $17_3$ are attached to the upper surface of the stationary disk 17 on concentric circles corresponding to the concentric circles on which the ball pockets 13 are arranged, respectively.

The ball that has fallen into the ball pocket 13 of the turntable 12 rests on one of the ball support bands $\mathbf{17}_1$, $\mathbf{17}_2$ and $\mathbf{17}_3$ and is held in the ball pocket 13. The ball 2 held in the ball pocket 13 rolls on the ball support band $\mathbf{17}_1$, $\mathbf{17}_2$ or $\mathbf{17}_3$ as the turntable 12 turns. The colored, translucent ball 2 held in the ball pocket 13 rolls.

When the LEDs 23 is driven to cause the light-emitting ring 22 fitted in the ball pocket 13 to emit light while the ball 2 held in the ball pocket 13 is rolling, light penetrated into the colored, translucent ball 2 is reflected by the reflective sheets 4 of the IC tag 3, and the position of which changes continuously as the ball 2 rolls. Consequently, the ball 2 glitters. The infrared sensors 24 and 25 are surely able to detect the translucent ball 2 rolling in the ball pocket 13.

Referring to FIG. 4, a circular opening 26 is formed in the central part of the stationary disk 17 so as to correspond to the blank pocket 14 of the turntable 12. The ball 2 that has fallen into the blank pocket 14 drops down through the circular opening 26.

A sectorial opening 27 is formed in the stationary disk 17 so as to extend radially across the ball support bands $\mathbf{17}_1$, $\mathbf{17}_2$ and $\mathbf{17}_3$. A sectorial flap 28 is fitted in the sectorial opening 27 from below the sectorial opening 27. The sectorial flap 28 is supported pivotally along its longitudinal edge. A solenoid actuator 29 turns the flap 28 upward to close the sectorial opening 27 and turns the same downward to open the sectorial opening 27.

In a state where the sectorial opening 27 is closed by turning the flap 28 upward, the ball held in the ball pocket 13 and rolling as the turntable 12 turns does not drop down through the sectorial opening 27 and continues rolling on the stationary disk 17. In a state where the sectorial opening 27 is opened by turning the flap 28 downward, the ball 2 that has fallen into and rolling in the ball pocket 13 drops down through the sectorial opening 27 upon the coincidence of the ball pocket 13 with the sectorial opening 27. Thus all the balls 2 rolling in the ball pockets 13 drop down through the sectorial opening 27 in one full turn of the turntable 12 when the sectorial opening 27 is kept open.

The sectorial opening 27, the flap 28 and the solenoid actuator 29 are included in the ball recovering mechanism 31. Referring to FIG. 2, the ball recovering mechanism 31 has a ball recovery box 32 disposed below the central, circular opening 36 and the sectorial opening 27. The ball recovering box 32 has a radially extending bottom wall sloping radially outward. The balls 2 dropped down through the sectorial opening 27 and the circular opening 26 into the ball recovering box 32 roll radially outward on the bottom wall of the ball recovering box 32 and are guided into the ball identifying mechanism 41 by a connecting duct 33.

Figure 7:
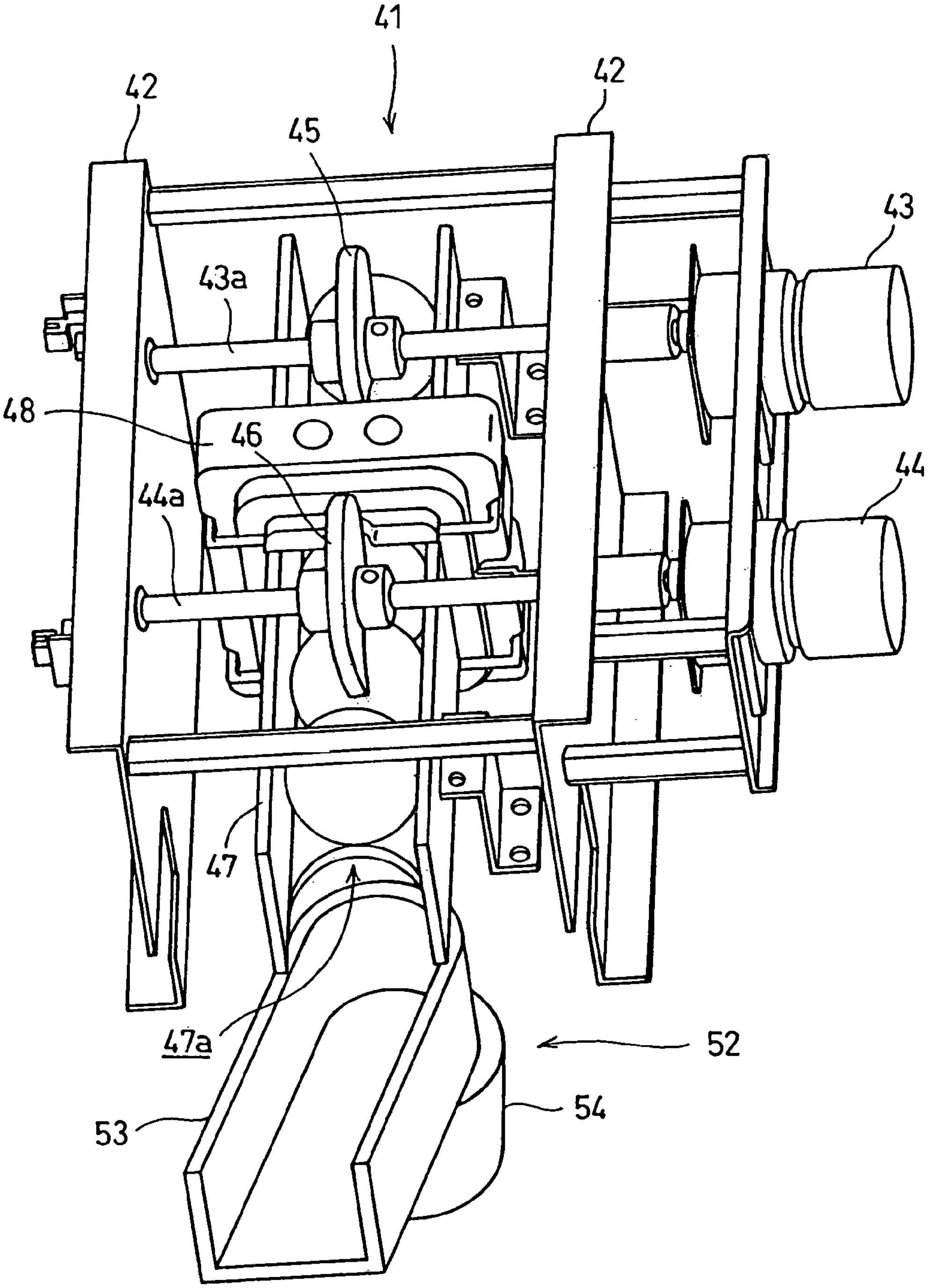
FIG. 7 is a perspective view of a ball identifying mechanism.
Figure 8:
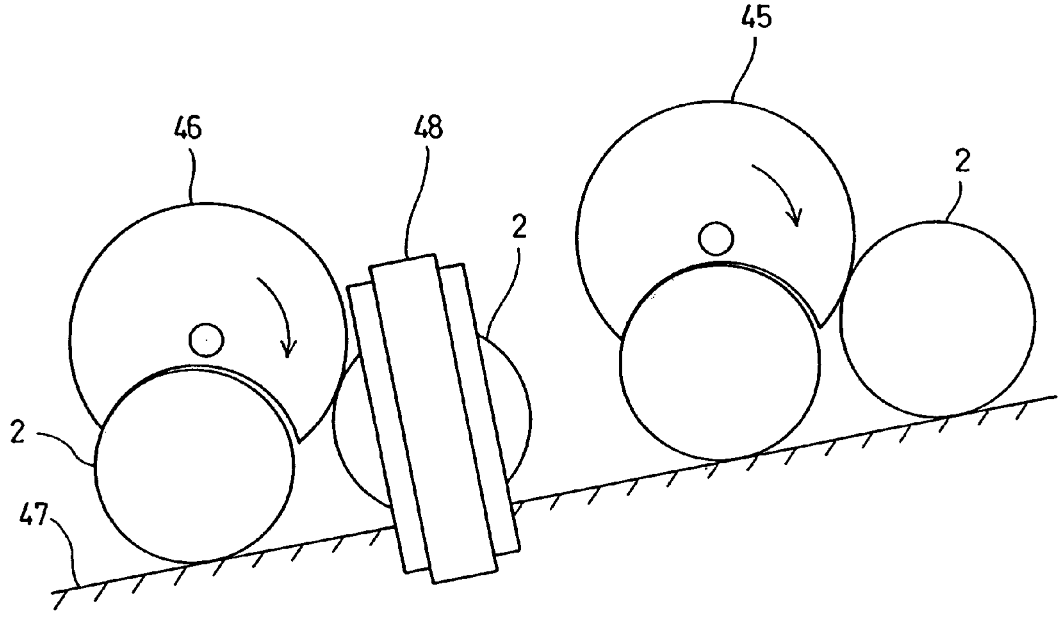
FIG. 8 is a fragmentary side elevation of the ball identifying mechanism.

Referring to FIGS. 7 and 8, the ball identifying mechanism 41 has opposite side frames 42, an upstream rotating shaft 43*a*, a downstream rotating shaft 44*a*, and rotating disks 45 and 46 fixedly mounted on the rotating shafts 43*a* and 44*a*, respectively. The rotating disks 45 and 46 are provided with circular recesses 45*a* and 46*a*, respectively. The rotating shafts 43*a* and 44*a* are driven for rotation by motors 43 and 44, respectively. A guide duct 47 extends under the rotating disks 45 and 46 so as to slope down in a direction in which the balls 2 move. The antenna 48 is disposed between the rotating disks 45 and 46. The antenna 48 has rectangular coils surrounding the guide duct 47.

As shown in FIG. 8, the ball 2 rolls down along the connecting duct 33 to the upstream rotating disk 45. Then, the upstream rotating disk 45 receives the ball 2 in the circular recess 45*a*. As the upstream rotating disk 45 rotates, the ball 2 caught in the circular recess 45*a* is moved toward the antenna 48. Then, the ball 2 rolls down along the sloping guide duct 47. When the ball 2 is on the verge of passing through the antenna 48 having the shape of a rectangular ring, the ball 2 comes into contact with the circumference of the downstream rotating disk 46 and is stopped by the lower rotating disk 46.

The antenna 48 and the IC tag 3 of the ball 2 constitute a RFID system (radio frequency identification system) using electromagnetic induction.

Although the IC tag 3 of the ball 2 thus stopped by the downstream rotating disk 46 is in an arbitrary position, one of the three coils perpendicular to each other of the IC tag 3 is in a positional relation with the antenna 48 that enables the coil to communicate with the antenna 48. First, the IC tag 3 receives a start signal sent out through the antenna 48. The energy of the start signal generates an electromotive force in the IC tag 3. Thus the control circuit of the IC tag 3 is energized and starts communication with the antenna 48.

The IC tag 3 sends out an identification signal representing identification information about the ball 2, namely, the color of the ball 2. The antenna 48 receives the identification signal, a deciphering means included in a computer 100 deciphers the identification signal to identify the ball 2. Thus, the color of the ball 2 held in the antenna 48 is known.

The IC tag 3 is provided with the three perpendicularly intersecting coils and, in general, one of the three coils is able to communicate with the antenna 48. In some cases, none of the three coils is able to communicate with the antenna 48 due to the delicately inappropriate positional relation between the antenna 48 and each of the three coils. In such a case, the downstream rotating disk 46 is turned through a small angle in either of opposite directions to roll the stopped ball 2 frictionally by the downstream rotating disk 46 so that the position of the IC tag 3 may be changed.

When the position of the IC tag 3 is thus changed, the positional relation between the antenna 48 and each of the three coils is changed. Consequently, one of the three coils becomes able to communicate with the antenna 48 in a high probability and the ball 2 can be practically surely identified.

The ball 2 thus identified by its color is received in the circular recess 46*a* of the downstream rotating disk 46 upon the coincidence of the circular recess 46*a* with the ball 2, which has been stopped in the antenna 48, as the downstream rotating disk 46 is turned. The rotating downstream rotating disk 46 carries the ball 2 downward.

As shown in FIG. 7, a circular recess 47*a* is formed at the downstream end of the bottom plate of the channel-shaped guide duct 47. The ball 2 moved downward by the downstream rotating disk 46 drops down through the circular recess 47*a* and moves toward the ball sorting mechanism 51.

Figure 9:
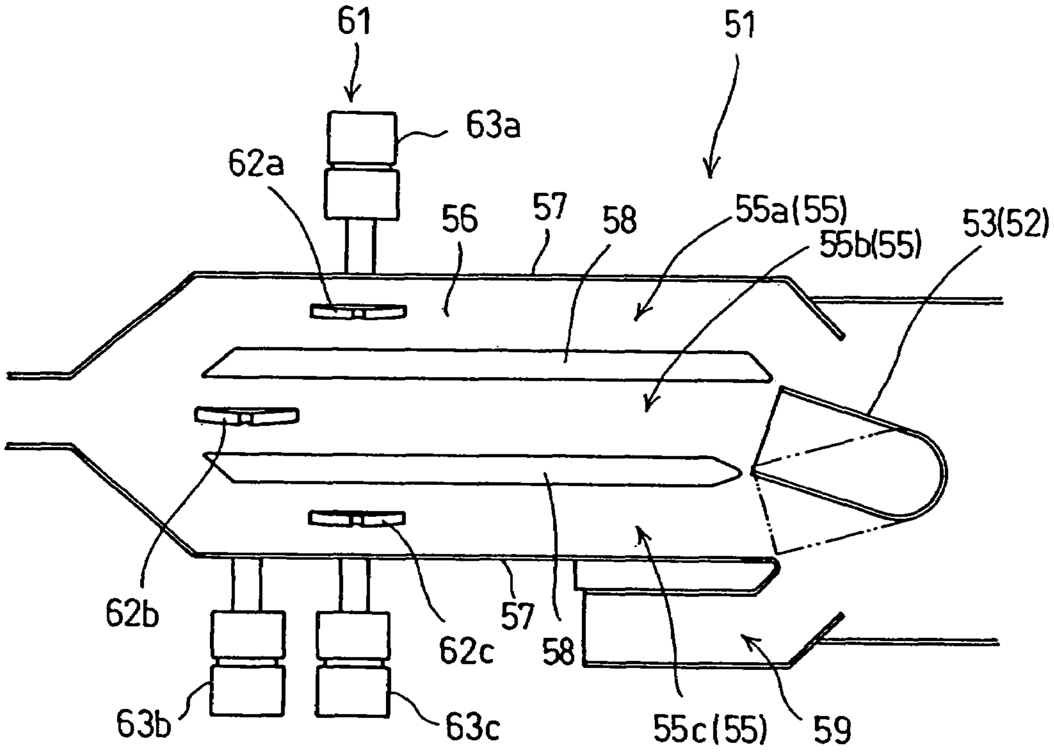
FIG. 9 is a plan view of a ball stocker, a ball sorting mechanism and a ball selecting mechanism.

Referring to FIG. 9, the ball sorting mechanism 51 has a ball sorting device 52 for sorting the balls 2 according to their colors and a ball stocker 55 for holding groups of the balls 2 sorted according to their colors. The ball stocker 55 is a channel-shaped structure having a wide bottom plate 56 and opposite side plates 57. The bottom plate 56 of the ball stocker 55 slopes down in a delivery direction. Two partition plates 58 are set on the bottom plate 55 so as to define three elongate grooves, namely, a red ball holding groove 55*a*, a green ball holding groove 55*b* and a yellow ball holding groove 55*c*

The entrances of the red ball holding groove 55*a*, the green ball holding groove 55*b* and the yellow ball holding groove 55*c* open at the upstream end of the ball stocker 55. The exits of the red ball holding groove 55*a*, the green ball holding groove 55*b* and the yellow ball holding groove 55*c* open at the downstream end of the ball stocker 55. Outer end parts of the opposite side plates 57 are inclined in the shape of a funnel so as to approach each other toward the downstream end of the ball stocker 55 to form an exit 64.

The ball sorting device 52 is disposed on the upstream side of the ball stocker 55. The ball sorting device 52 has a swinging distribution chute 53 having an entrance and an exit, and a motor 54 for driving the swinging distribution chute 53. The entrance of the swinging distribution chute 53 is positioned below the circular recess 47*a* of the guide duct 47 of the ball identifying mechanism 41. The motor 54 drives the swinging distribution chute 53 to distribute the balls 2 selectively to the red ball holding groove 55*a*, the green ball holding groove 55*b* or the yellow ball holding groove 55*c*.

The swinging distribution chute 53 has a U-shaped side plate having a semicircular upper end part defining the entrance, and a bottom plate. The swinging distribution chute 53 is turned about an axis passing the center of a circle corresponding to the semicircular upper end part of the side plate to position the exit of the swinging distribution chute 53 selectively at the entrance of the red ball holding groove 55*a*, the green ball holding groove 55*b* or the yellow ball holding groove 55*c*.

The ball stocker 55 has an ejection duct 59 on the outer side of the yellow ball holding groove 55*c*. In case of need, the swinging distribution chute 53 is turned to position the exit thereof at the entrance of the ejection duct 59 to eject the ball 2 outside.

The center about which the swinging distribution chute 53 is turned is directly below the circular recess 47*a* of the guide duct 47. The ball 2 identified by the ball identifying mechanism 41 rolls down along the guide duct 47 and drops down through the circular recess 47*a* on the entrance of the swinging distribution chute 53. Then, the swinging distribution chute 53 is turned so that the exit thereof coincides with the entrance of the ball holding groove corresponding to the color of the ball 2 to deliver the ball 2 to the corresponding ball holding groove. The red balls, the green balls and the yellow balls are distributed to the red ball, the green ball and the yellow ball holding groove, respectively. Thus the balls 2 are sorted according to their colors.

Slots are formed in parts of the bottom plate 56 near the respective exits of the red ball holding groove 55*a*, the green ball holding groove 55*b* and the yellow ball holding groove 55*c*. Vanes of vane wheels 62*a*, 62*b* and 62*c* protrude upward through the slots. The vane wheels 62*a*, 62*b* and 62*c* hold the balls 2 successively distributed to the ball holding grooves 55*a*, 55*b* and 55*c* in rows in the ball holding grooves 55*a*, 55*b* and 55*c*. The red balls 2, the green balls 2 and the yellow balls 2 are held in rows in the red ball holding groove 55*a*, the green ball holding groove 55*b* and the yellow ball holding groove 55*c*, respectively.

Figure 10:
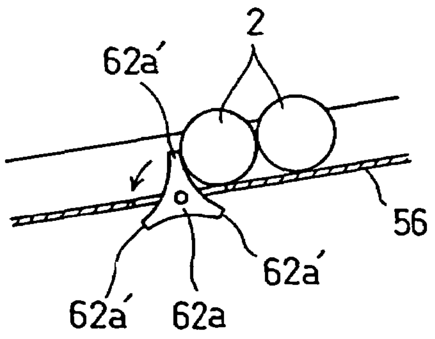
FIG. 10 is a fragmentary side elevation of the ball selecting mechanism.

The vane wheels 62*a*, 62*b* and 62*c* are included in the ball selecting mechanism 61. The vane wheels 62*a*, 62*b* and 62*c* are driven for turning by motors 63*a*, 63*b* and 63*c*, respectively. As shown in FIG. 10, the vane wheel 62*a* has three radial vanes 62*a*' arranged at equal angular intervals and formed by cutting three peripheral parts, spaced at equal angular intervals, of a circular plate in circular recesses. The vane 62*a*' projects upward through the slot of the inclined bottom plate 56 to stop the balls 2 rolling down on the bottom plate 56. The balls 2 are held in a successive arrangement in the ball holding grooves 55*a*, 55*b* and 55*c*.

When the motor 63*a* turns the vane wheel 62*a* through an angle of 120° to retract the vane 62*a* into the slot. Then, the ball 2 in contact with the vane 62*a*' is released and the ball 2 rolls down. The next ball 2 behind the released ball 2 is stopped by the next vane 62*a*'.

The vane wheel 62*a* holding the red balls 2 in the red ball holding groove 55*a* is driven by the motor 63*a* for turning by one third of a turn at a time to deliver one red ball at a time through the exit 64 to the ball dropping mechanism 71 (FIG. 2).

The vane wheels 62*b* and 62*c* are the same in shape as the vane wheel 62*a* and are driven individually by the motors 63*a* and 63*c*. The motor 63*b* drives the vane wheel 62*b* for turning by one third of a turn to deliver one green ball 2. The motor 63*c* drives the vane wheel 62*c* for turning by one third of a turn to deliver one yellow ball 2. Thus, the balls 2 are delivered one by one to the ball dropping mechanism 71.

The color indicating the type of the ball 2 to be dropped onto the turntable 12 by the ball dropping mechanism 71 is determined. Suppose that the color is red (green or yellow). Then, the motor 63*a* (63*b* or 63*c*) is actuated to turn the vane wheel 62*a* (62*b* or 62*c*) by one third of a turn to deliver one of the red balls (the green balls or the yellow balls) 2 from the red ball holding groove 55*a* (the green ball holding groove 55*b* or the yellow ball holding groove 55*c*). The ball 2 thus delivered rolls down through the exit 64 and a connecting duct 65 to the ball dropping mechanism 71. The ball dropping mechanism 71 drops the ball 2 onto the turntable 12.

The ball dropping mechanism 71 has a vertical elevator 72 vertically extending between the connecting duct 65 and the circular guide plate 16 of the turntable mechanism 11, and an inclined dropping chute 79 through which the ball 2 is dropped onto the inner periphery of the circular guide plate 16.

Figure 11:
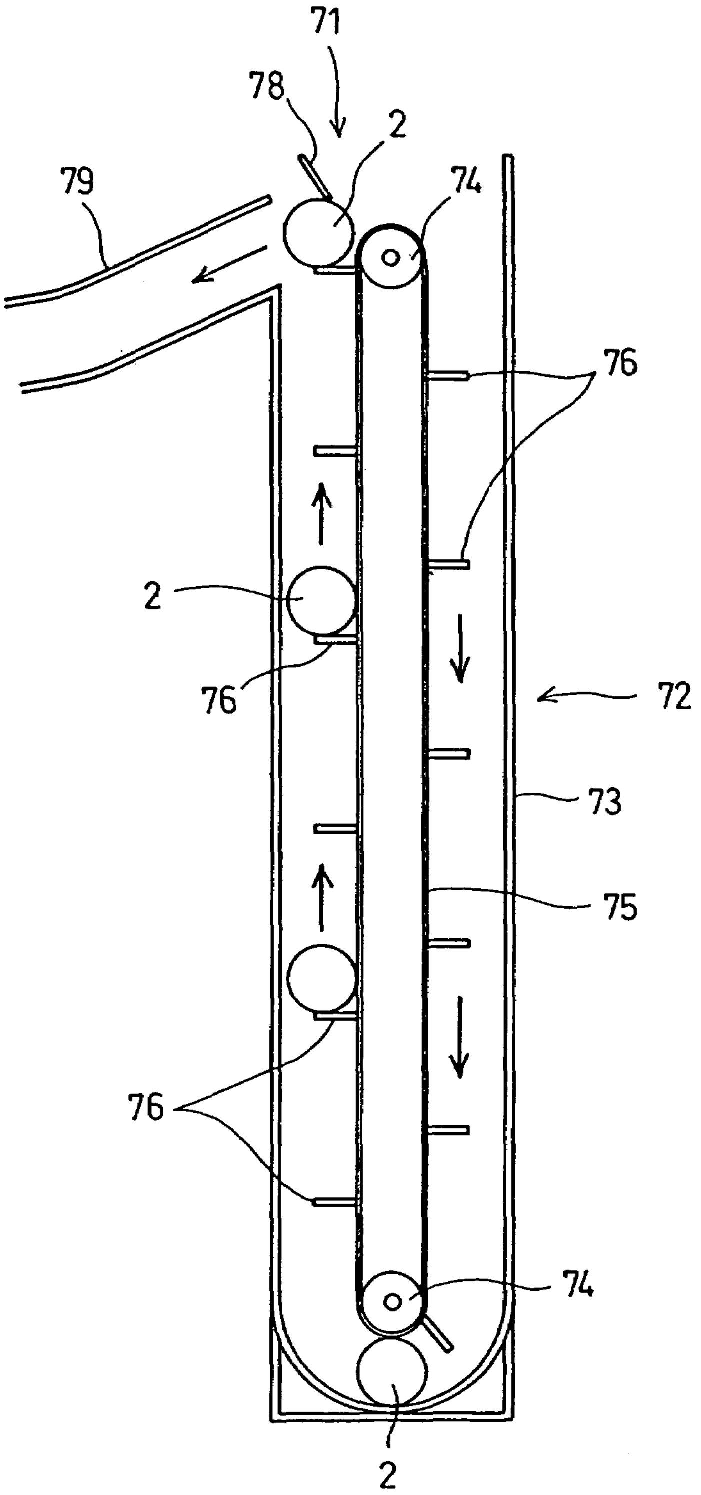
FIG. 11 is a sectional view of a ball dropping mechanism.

Referring to FIG. 11, the elevator 72 has a tubular case 73, a belt conveyor including upper and lower pulleys 74 and an endless belt 75 extended between the pulleys 74, and a motor 77. A plurality of ball supports 76 are arranged at intervals to the endless belt 75 so as to project from the endless belt 75. The motor 77 drives the lower pulley 74 to turn the endless belt 75. The ball support 76 scoops up the ball 2 delivered to a position under the lower pulley 74, supports the ball 2 and carries the ball 2 upward.

A delivery member 78 is disposed near and on the front side of the upper pulley 74. The ball 2 carried upward by the ball support 76 is shoved off the ball support 76 by the delivery member 78 and drops into the dropping chute 79. Then, the ball 2 rolls down through the inclined dropping chute 79 and runs out from the dropping chute 79 onto the circular guide plate 16 at a predetermined speed in a direction tangent to an inner circular lane 16*a*.

The circular lane 16*a* of the circular guide plate 16 has the shape of a conical surface merging into the upper surface of the turntable 12. The ball 2 run out of the dropping chute 79 in the tangential direction rolls along circular paths on the circular lane 16*a* and approaches the turntable 12 gradually. Eventually, the ball 2 moves to the turntable 12 rotating in a rotating direction opposite the revolving direction of the ball 2. The ball 2 revolves along circles, gradually approaching the center of the turntable 12. When the ball 2 falls into one of the ball pockets 13, it is a success. When the ball 2 falls into none of the ball pockets 13, the ball falls eventually into the blank pocket 14 at the lowermost position.

Figure 12:
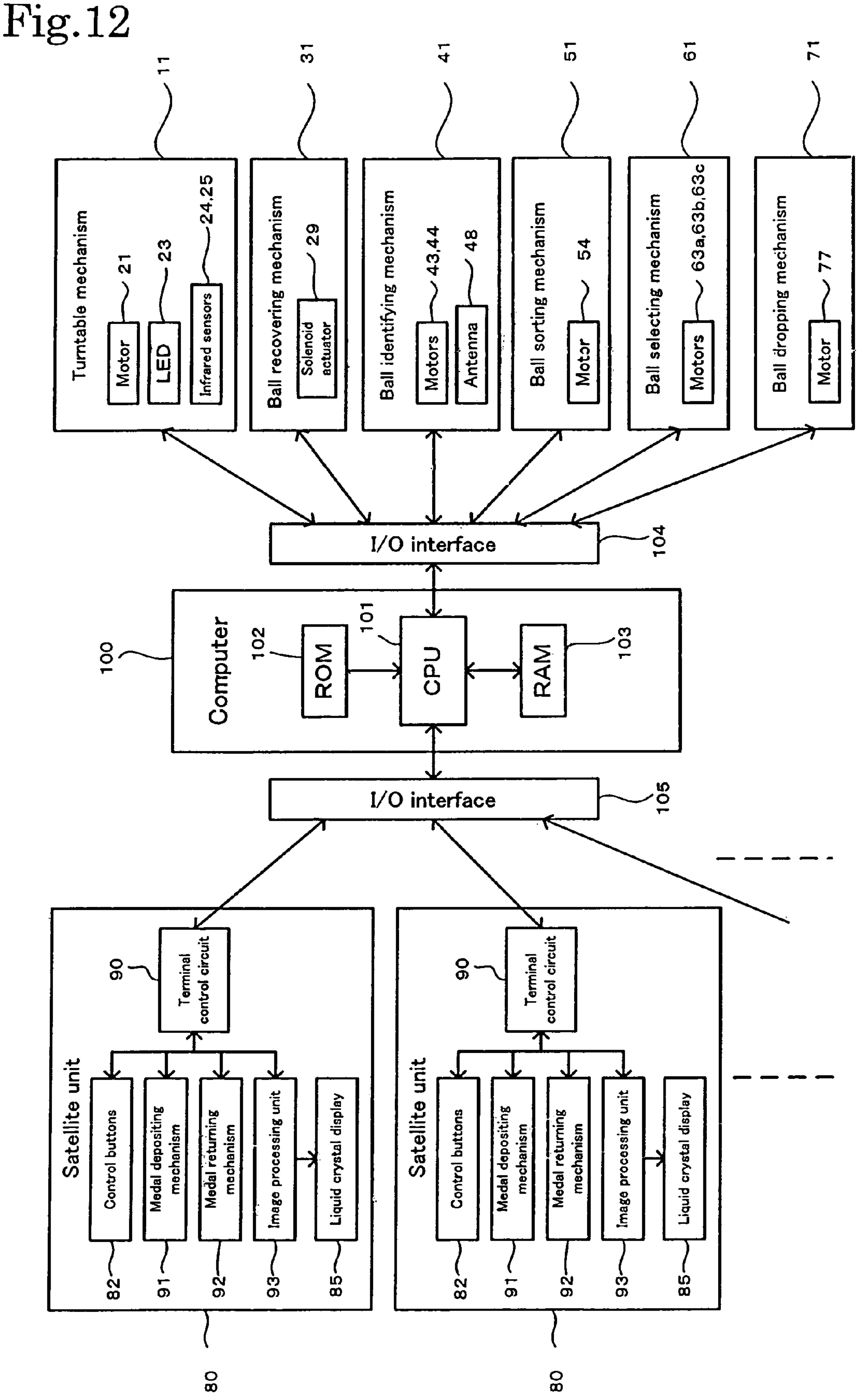
FIG. 12 is a block diagram of a control system included in the bingo game machine shown in FIG. 1.

FIG. 12 is a block diagram of a control system included in the bingo game machine 1.

A computer 100 controls the lottery device 10 and the eight satellite units 80. A ROM 102 stores programs. A CPU 101 reads out a program from the ROM 102 and executes control operations according to the program, properly using data stored in a RAM 103.

The CPU 101 is connected through an I/O interface 104 to the turntable mechanism 11, the ball recovering mechanism 31, the ball identifying mechanism 41, the ball sorting mechanism 51, the ball selecting mechanism 61 and the ball dropping mechanism 71 of the lottery device 10. The CPU 101 receives input signals, namely, detection signals provided by the infrared sensors 24 and 25 of the turntable mechanism 11, and the antenna 48 of the ball identifying mechanism 41. The CPU 101 processes the input signals and gives drive signals to the motors 21, 43, 44, 54, 63 and 77, the solenoid actuator 29 and the LEDs 23.

Each of the eight satellite units 80 is provided with a terminal control circuit 90. The terminal control circuits 90 exchange signals with the CPU 101 through an I/O interface 105.

The terminal control circuit 90 controls and drives a medal depositing mechanism 91 and a medal returning mechanism 92 in response to input signals given thereto by operating control buttons 82, namely, control means, of the satellite unit 80. The terminal control circuit 90 gives an image specifying signal to an image processing unit 93. The image processing unit 93 displays an image, such as an image of a bingo grid, by a liquid crystal display 85.

The computer 100 carries out the centralized management of the lottery device 10 and the eight satellite units 80. The computer 100 makes the liquid crystal displays 85 of the satellite units 80 display data including the numbers of the ball pockets 13 into which the balls have fallen on the bingo grids 86 and monitors the state of the lottery game continuously.

The computer 100 receives information about the bingo grids 86, namely, number arrangement data, made by the terminal control circuits 90 of the satellite units 80 and makes the RAM 103 of the satellite units 80 store the bingo grids 86 temporarily. The number arrangement data is position information about the positions of numbers arranged on the bingo grid 86.

The computer 100 receives detection signals from the infrared sensors 24 and 25 every time the ball pocket 13 combined with the infrared sensors 24 and 25 wins the lottery, i.e., every time the ball 2 falls into the ball pocket 13. Then, the computer 100 finds out the number assigned to the ball pocket 13 won the lottery. The computer 100 determines the respective states of lottery of the bingo grids 86 by a predetermined algorithm on the basis of the numbers of the ball sockets 13 found out and the arrangement data on the bingo grids 86.

The computer 100 calculates the number of winning numbers on one row in each bingo grid 86 to monitor the state of the lottery game. Five numbers covered in a row constitute a bingo, namely, a win. Four numbers covered in a row constitute a lizhi needing one more number to win the bingo game.

Figure 13:
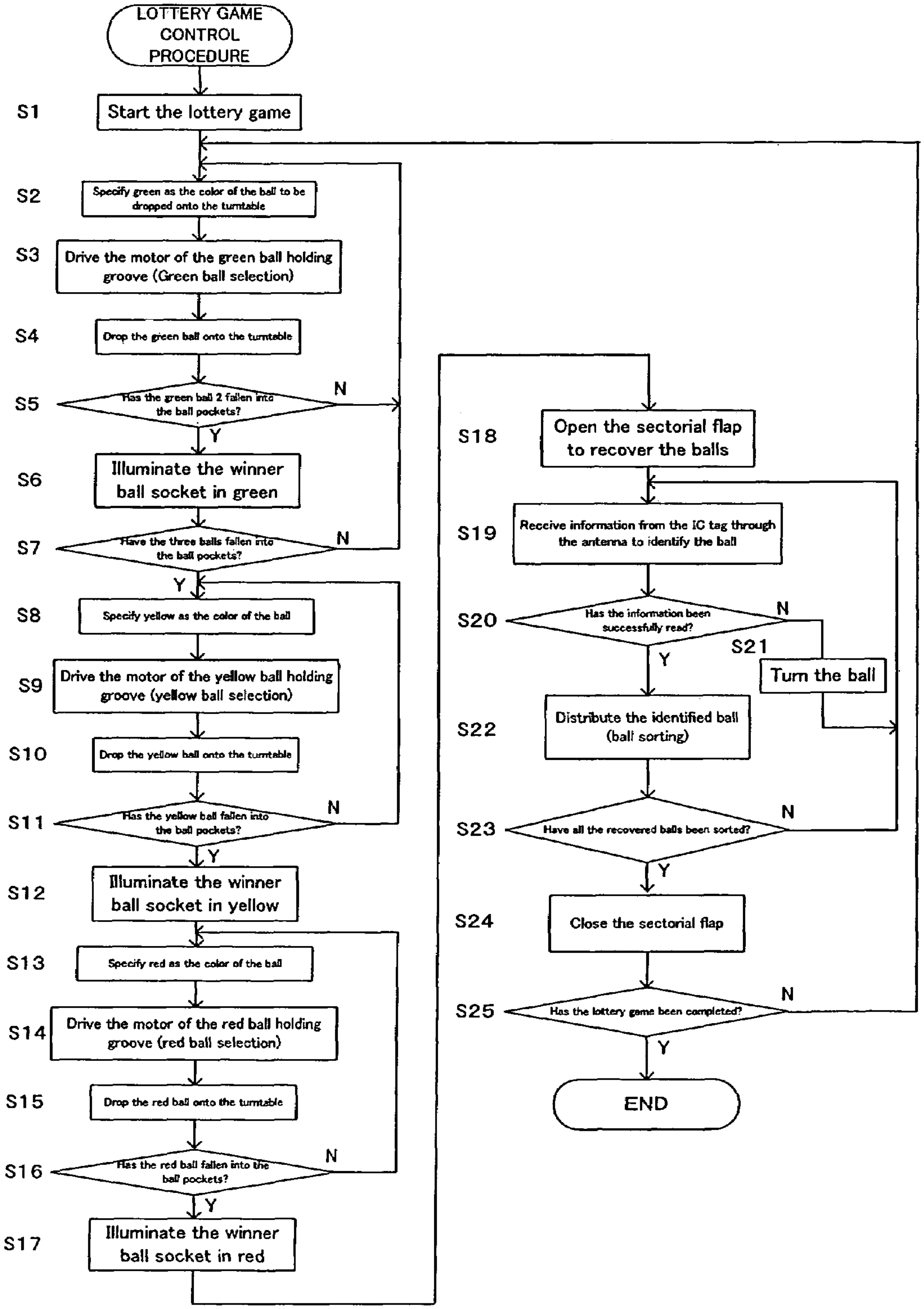
FIG. 13 is a flow chart of a lottery game control procedure for controlling light emission and balls.
Figure 14:
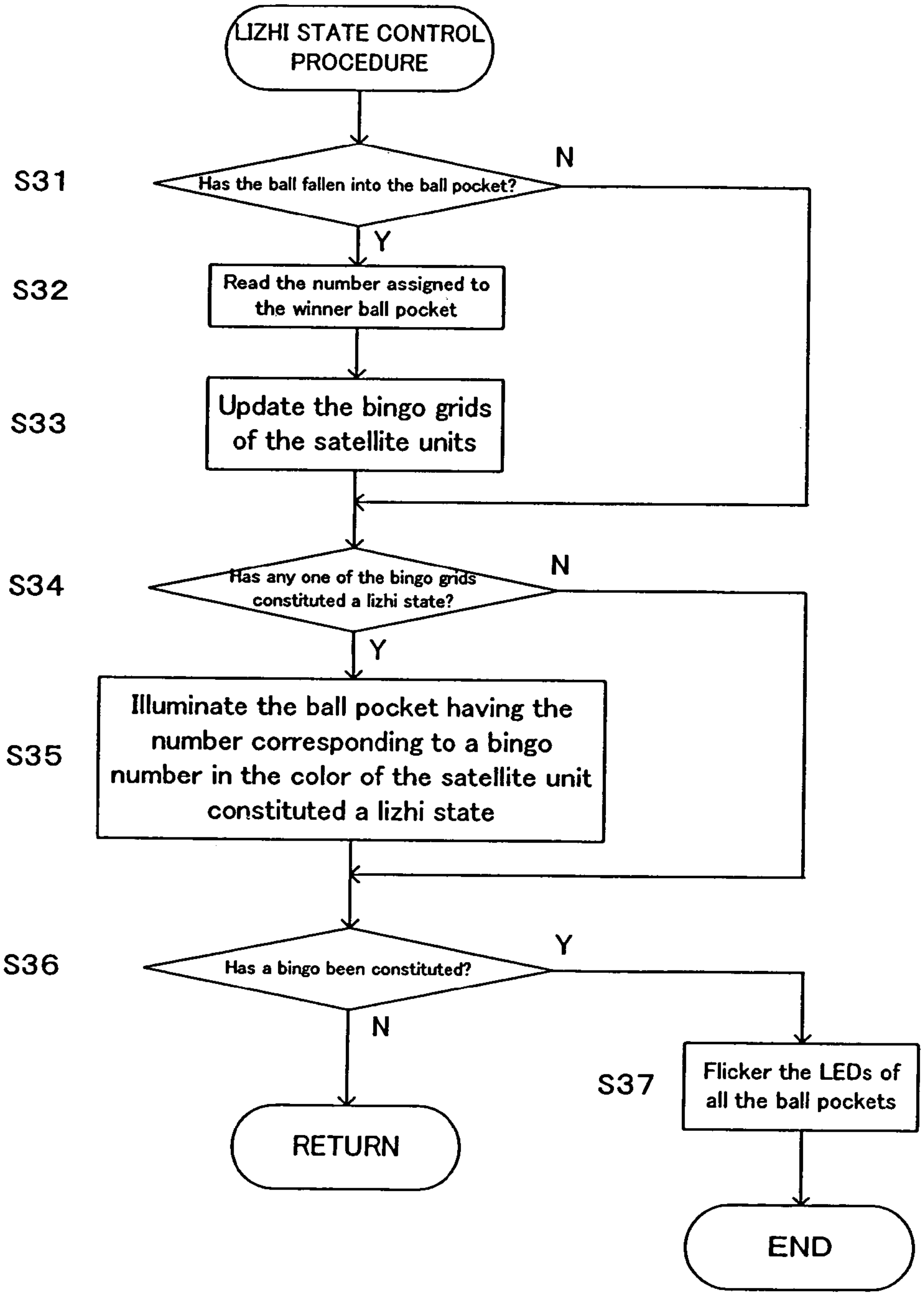
FIG. 14 is a flow chart of a lizhi state control procedure for controlling lizhi indicating lighting.

A lottery control procedure to be executed by the computer 100 to control the LEDs for light emission and to control the balls 2 will be described with reference to a flow chart shown in FIG. 13.

Each player sitting at the satellite unit 80 deposits a medal into the medal slot 83 and becomes ready for the bingo game. Then, the motor 21 starts rotating the turntable 12 to start the bingo game in step S1.

Then, green is specified for the first ball 2 in step S2. The ball selecting mechanism 61 actuates the motor 56*b* to turn the vane wheel 62*b* of the green ball holding groove 55*b* by one third of a turn. Thus, one of the green balls 2 held in the green ball holding groove 55*b* is sent out in step S3.

The thus selected green ball 2 is transferred to the ball dropping mechanism 71 and the motor 77 of the elevator 72 is actuated. Then, the ball support 76 supports the green ball 2 and carries the green ball 2 upward. The delivery member 78 shoves the green ball 2 off the ball support 76 into the dropping chute 79. Then, the green ball 2 runs out from the dropping chute 79 onto the turntable 12 in step S4.

The green ball 2 dropped onto the turntable 12 rolls on the turntable 12. The green ball 2 falls into one of the ball pockets 13 to draw the number assigned to the same ball pocket 13. The green ball 2 falls into the blank pocket 14 to draw a blank. In step S5, the infrared sensors 24 and 25 operate to see whether or not the green ball 2 has fallen into the corresponding ball pockets 13, i.e., whether or not the corresponding ball pockets 13 have drawn a win. The two infrared sensors 24 and 25 combined with each ball pocket 13 is able to detect the ball 2 fallen into the same ball pocket 13 with reliability.

If the green ball 2 has fallen into the ball pocket 13 and the ball pocket 13 has drawn a win, the control procedure goes to step S6. If none of the ball pockets 13 has drawn a win, the control procedure returns to step S2 and a loop of steps S2, S3, S4 and S5 is executed again to select the green ball 2, to send out the green ball 2, to drop the green ball 2 onto the turntable 12 and to determine whether or not any one of the ball pocket 13 has drawn a win.

The loop of steps S2, S3, S4 and S5 is repeated until one of the ball pockets 13 draws a win. When the ball 2 falls into the ball pocket 13, i.e., when the ball pocket 13 becomes a winner ball pocket, the green LEDs 23 of the light-emitting ring 22 fitted in the winner ball pocket 13 are turned on in step S6. Consequently, the light-emitting ring 22 fitted in the winner ball pocket 13 into which the green ball 2 has fallen shines in green and the translucent green ball 2 glitters in green.

In step S7, a query is made to see if the three balls 2 have fallen into the ball pockets 13, i.e., if the three ball pockets 13 have drawn a win. If the response in step S7 is negative, the control procedure returns to step S2, and a loop of steps S2 to S7 is repeated until the three green balls 2 fall into the ball pockets 13.

After the three green balls 2 have fallen into the ball pockets 13, yellow is selected as the color of the ball 2 in step S8. The ball selecting mechanism 61 actuates the motor 56*c* to turn the vane wheel 62*c* of the yellow ball holding groove 55*c* by one third of a turn. Thus, one of the yellow balls 2 held in the yellow ball holding groove 55*c* is sent out in step S9.

The thus selected yellow ball 2 is dropped onto the turntable 12 by the ball dropping mechanism 71 in step S10.

A query is made in step S11 to see if the yellow ball 2 dropped onto the turntable 12 has fallen into some one of the ball pockets 13, i.e., if some one of the ball pockets 13 has drawn a win. If none of the ball pockets 13 has drawn a win, the control procedure returns to step S8 and a loop of steps S8, S9, S10 and S11 is executed again to select the yellow ball 2, to send out the yellow ball 2, to drop the yellow ball 2 onto the turntable 12 and to determine whether or not any one of the ball pocket 13 has drawn a win.

The loop of steps S8, S9, S10 and S11 is repeated until one of the ball pockets 13 draws a win. If the yellow ball 2 has fallen into the ball pocket 13 and the ball pocket 13 has drawn a win, the control procedure goes to step S12. In step S12, when the yellow ball 2 falls into the ball pocket 13 and the ball pocket 13 becomes a winner ball pocket, the yellow LEDs 23 of the light-emitting ring 22 fitted in the winner ball pocket 13 are turned on. Consequently, the light-emitting ring 22 fitted in the winner ball pocket 13 into which the yellow ball 2 has fallen shines in yellow and the translucent yellow ball 2 glitters in yellow.

After the one yellow ball 2 has fallen into the winner ball pocket 13, red is selected as the color of the ball 2 in step S13.

The ball selecting mechanism 61 actuates the motor 56*a* to turn the vane wheel 62*a* of the red ball holding groove 55*a* by one third of a turn. Thus, one of the red balls 2 held in the red ball holding groove 55*a* is sent out in step S14.

The thus selected red ball 2 is dropped onto the turntable 12 by the ball dropping mechanism 71 in step S15. A query is made in step S16 to see if the red ball 2 dropped onto the turntable 12 has fallen into some one of the ball pockets 13, i.e., if some one of the ball pockets 13 has drawn a win. If none of the ball pockets 13 has drawn a win, the control procedure returns to step S13 and a loop of steps S3, S14, S15 and S16 is executed again to select the red ball 2, to send out the red ball 2, to drop the red ball 2 onto the turntable 12 and to determine whether or not any one of the ball pockets 13 has drawn a win.

The loop of steps S13, S14, S15 and S16 is repeated until one of the ball pockets 13 draws a win. If the red ball 2 has fallen into the ball pocket 13 and the ball pocket 13 has drawn a win, the control procedure goes to step S17. In step S17, when the red ball 2 falls into the ball pocket 13 and the ball pocket 13 becomes a winner ball pocket, the red LEDs 23 of the light-emitting ring 22 fitted in the winner ball pocket 13 are turned on. Consequently, the light-emitting ring 22 fitted in the winner ball pocket 13 into which the red ball 2 has fallen shines in red and the translucent red ball 2 glitters in red.

After the three green balls 2, the one yellow ball 2 and the one red ball 2 have fallen into the ball pocket 13 and those ball pockets 13 have drawn a win, the five numbers assigned to those winner ball pockets 13 are determined. Thus, it is possible that the five numbers on some of the bingo grids 86 displayed by the liquid crystal displays 85 of the satellite units 80 are covered in a row and some of the players sitting at the satellite units 80 draws a win.

When the five numbers on the bingo grid of one of the satellite units are covered in a row and becomes a winner satellite unit 80, medals are paid off at the payoff return 84 of the winner satellite unit 80 or the credit of the winner satellite unit 80 is increased.

After the five numbers of the bingo grid of the winner satellite unit 80 has been covered in a row, the sectorial flap 28 covering the sectorial opening 27 of the stationary disk 17 retaining the five balls 2 in the ball pockets 13 is opened by actuating the solenoid actuator 29 in step S18.

Consequently, all the balls 2 retained in the ball pockets 13 drop down through the sectorial slot 27 into the ball recovery box 33 while the turntable 12 makes one full turn. The balls 2 thus recovered are returned through the connecting duct 33 to the ball identifying mechanism 41.

In step S19, the RFID system of the ball identifying mechanism 41 identifies each of the returned balls 2. The identification information recorded on the IC tag 3 held in the ball 2 can be successfully read when communication between the antenna 48 and the three perpendicularly intersecting coils of the IC tag 3 is satisfactory. Reading the identification information results in failure when communication between the antenna 48 and the three perpendicularly intersecting coils of the IC tag 3 is unsatisfactory.

A query is made in step S20 to see whether or not the identification information is successfully read. If reading the identification information is unsuccessful, the lower rotating disk 46 of the ball identifying mechanism 41 is turned slightly in step S21 to turn the ball 2 relative to the antenna 48 so that the position of the IC tag 3 may be changed. Then, step S19 is executed again to identify the ball 2.

After the ball 2 has been correctly identified and the identification information, such as information about the color of the ball 2, has been successfully read, the swinging distribution chute 53 distributes the ball 2 to the red ball holding groove 55*a*, the green ball holding groove 55*b* or the yellow ball holding groove 55*c* in step S22.

A query is made in step S23 to see if all the recovered balls 2 have been sorted according to their colors. If the response to the query in step S23 is negative, step S19 is executed again to identify and sort the ball 2. After all the recovered balls 2 have been sorted, the sectorial flap 28 of the turntable mechanism 41 is closed in step S24 to prepare for the next cycle of the bingo game. Then, the control procedure goes to step S25.

A query is made in step S25 to see if the bingo game is over. If the response to the query in step S25 is negative, the control procedure returns to step S2 to start the next cycle of the bingo game. If the response in step S25 is affirmative, the bingo game is ended.

In the lottery device 10 of the bingo game machine 1, the light-emitting ring 22 fitted in the ball pocket 13 into which the ball 2 has fallen shines in the color of the ball. The shining light-emitting rings 22 exercise a high amusing effect on the players, are made to shine most effectively according to the state of the bingo game to appeal the functions of the ball pockets 13 in the bingo game and engross the players in the bingo game.

Ball dropping order is not limited to the order of green, yellow and red balls.

When lizhi is constituted in the bingo game machine 1, the computer 100 executes a lizhi state indicating procedure for causing the light-emitting rings 22 (the LEDs 23) fitted in the ball pockets 13 other than the foregoing ball pockets 13 to emit light indicating a lizhi state. The lizhi state indicating procedure will be described with reference to a flow chart shown in FIG. 14.

A query is made in step S31 to see if the ball 2 has fallen into the ball pocket 13. The lizhi control procedure goes to step S34 if the response to the query in step S31 is negative or to step S32 if the response to the query in step S31 is affirmative. In step S32, the number assigned to the ball pocket 13 into which the ball has fallen among the numbers 1 to 25 is read.

In step S33, the bingo grids 86 of the satellite units 80 are updated on the basis of the read number of the winner ball pocket 13.

The computer 100 monitors the respective lottery states of all the satellite units 80, i.e., the respective states of the bingo grids 86 of the satellite units 80. A query is made in step S34 to see if any one of the bingo grids 86 is in a lizhi state in which the four numbers are covered in a row and one more number needs to be covered to win the bingo game.

After a lizhi state has been constituted, a bingo is constituted when the ball 2 falls into the specific ball pocket 13 to which a winning number, namely, a bingo number, is assigned.

If the response to the query in step S34 is affirmative, the LEDs 23 of the light-emitting ring 22 fitted in the specific ball pocket 13 to which the bingo number is assigned are made to emit light. A special color is assigned to the satellite unit 80 constituting a lizhi state and the LEDs 23 emit light in the special color. Preferably, the special colors assigned to the satellite units 80, respectively, are those capable of clearly specifying the satellite units 80.

The eight satellite units 80 of the bingo game machine 1 are colored in different colors, respectively. The special colors identifying the satellite units 80 are those coloring the satellite units 80.

Color information about the colors identifying the satellite units 80 is stored beforehand in the ROM 102. When the computer 100 monitoring the state of the lottery game decides that one of the satellite units 80 constituting a lizhi state, the computer 100 makes the LEDs 23 emit light in a color specified by the color information about the color of the satellite unit 80 constituting a lizhi state. Thus, the light-emitting ring 22 fitted in the ball pocket 13, having the number corresponding to a bingo number, of the turntable 12 of the bingo game machine 1 emits light in the color identifying the satellite unit 80 that has constituted a lizhi state.

The empty ball pocket 13 emitting light notifies the players of a state where one of the satellite units 80 has constituted a lizhi state and the satellite unit 80 will constitute a bingo when the ball 2 falls into the empty ball pocket 13 emitting light. The players can now know which one of the satellite units 80 is in a lizhi state from the color of light emitted by the light-emitting ring 22 fitted in the ball pocket 13.

The player sitting at the satellite unit 80 in a lizhi state is able to know the special ball pocket 13 into which the ball 2 needs to fall to constitute a bingo from the color of light emitted by the LEDs 23 of the light-emitting ring 22 fitted in the special ball pocket 13 corresponding to that of the satellite unit 80. Then, the player will concentrate attention on a chance for the ball 2 to fall into the special ball pocket 13 and will be engrossed in the bingo game.

When the satellite unit 80 is in a lizhi state, the LEDs 23 of the light-emitting ring 22 fitted in the special ball pocket 13 are driven for light emission in step S35. Then, a query is made in step S36 to see if a bingo has been constituted.

The lizhi state control procedure returns to step S31 if the response to the query in step S36 is negative. If the response to the query in step S36 is affirmative, the LEDs 23 of all the light-emitting rings 22 fitted in the ball pockets 13 are driven for flickering in step S37, and then the lizhi state control procedure is ended.

Figure 15:
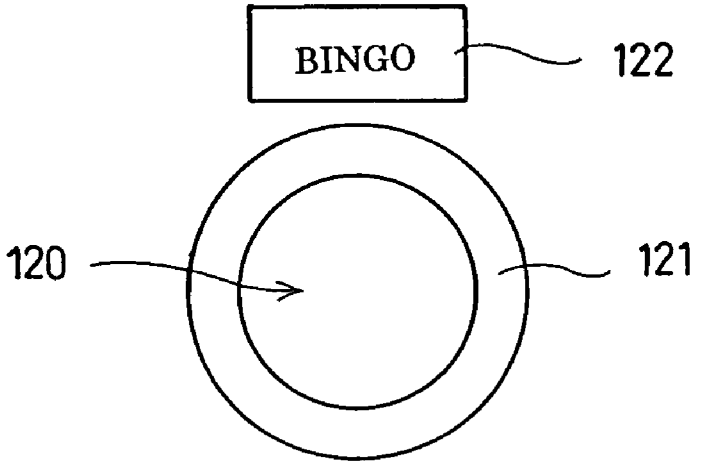
FIG. 15 is a plan view of a ball pocket associated with a turntable and associated parts in a bingo game machine in another embodiment of the present invention.

Although the numbers 1 to 25 are assigned to the twenty-five ball pockets 13 of the turntable 12 of the lottery device 10 in this embodiment, the turntable 12 may be provided with liquid crystal displays 122 disposed adjacent to ball pockets 120 in which light-emitting rings 121 are fitted as shown in FIG. 15 to display an image of characters and patterns in addition to a number specifying the ball pocket 120.

When the turntable 12 is provided with the liquid crystal displays 122, the computer 100 includes an image generating device and an image control device. The image control device controls the liquid crystal displays 122 to display images generated by the image generating device.

Images to be generated by the image generating device may be those represented by image data stored beforehand in a storage device, such as a ROM or may be those generated by a predetermined algorithm.

Normally, a number is displayed on the screen of the liquid crystal display 122. When a lizhi state is constituted, a word "BINGO" may be displayed by the liquid crystal display 122 as shown in FIG. 15.

An LED dot matrix display formed by arranging small LEDs in a matrix may be used instead of the liquid crystal display 122.

An LED dot matrix may be formed on the side surface of the ball pocket 13 instead of fitting the light-emitting ring 22 provided with the LEDS 23 in the ball pocket 13.

The ball identifying mechanism 41 employs the RFID system and the IC tag 3 held in the ball 2 holds color information about the color of the ball 2 to identify the ball 2 only by color. Attributes of the ball 2 other than the color, such as the size of the ball 2, may be recorded on the IC tag 3 to identify the ball 2 by an attribute thereof other than the color.

The ball 2 for the player can be discriminated from those for the other players regardless of the attribute and appearance of the ball 2.

Since the balls 2 can be thus identified, lottery balls including a lucky ball may be used. When the lucky ball dropped onto the turntable 12 falls into one of the ball pockets 120, a first number assigned to the ball pockets 120 into which the lucky ball has fallen, a second number smaller than the first number by one and a third number greater than the first number by one may be regarded as winning numbers and a word "BONUS" or such may be displayed by the liquid crystal displays 122 corresponding to the ball pockets 120 marked with the winning numbers.

In this embodiment, the computer 100 stores the virtual bingo grids for the satellite units 80 in the ROM 103 and monitors the state of the lottery game in a centralized monitoring mode. The terminal control circuit 90 of each satellite unit 80 may generate information about the bingo grid, such as number arrangement data, may receive information from the computer 100 about the number assigned to the ball pocket 13 into which the ball has fallen every time the ball 2 falls into the ball pocket 13 and may determine the state of the bingo grid by a predetermined algorithm on the basis of the information about the number and the number arrangement data on the arrangement of numbers on the bingo grid of the satellite unit 80.

The terminal control circuit 90 that generates the information about the bingo grid, the infrared sensors 24 and 25 that provide information about the number assigned to the winner ball pocket 13, and the computer 100 constitute a lottery state monitoring system. The computer 100 receives a signal representing the number assigned to the winner ball pocket, determines the color assigned to the satellite unit 80 sent out the signal representing the number assigned to the winner ball pocket on the basis of the color information stored in the ROM 102, and causes the light-emitting ring 22 fitted in the winner ball pocket 13 of the turntable 12 to emit light in the color assigned to the same satellite unit 80.

When the terminal control circuit 90 of the satellite unit 80 and the computer 100 decide that the bingo grid for the satellite unit 80 is in a lizhi state, a uncovered number, namely, a bingo number, in a row of the four covered numbers on the bingo grid constituting a lizhi state is determined on the basis of the number arrangement data, and the bingo number is given to the computer 100.

Upon the reception of the bingo number, the computer 100 specifies the color assigned to the satellite unit 80 that sent the bingo number to the computer 100 on the basis of color information stored in the ROM 102 and causes the light-emitting ring 22 of the ball pocket 13 marked with the bingo number to emit light in the color assigned to the satellite unit 80 in a lizhi state.

What is claimed is:

1. A lottery device having a table provided with a plurality of openings, balls to be rolled on the table, and lottery means for detecting the ball that has fallen into the opening, said lottery device comprising:

ball detecting means combined with the openings, respectively, to provide a detection signal upon detection of the ball that has fallen into the opening;

light-emitting means combined with the openings, respectively, to emit light of different colors;

a ball identifying mechanism for identifying the balls by type; and control means including a storage unit storing control programs and controlling lottery operations according to the control programs;

wherein the control means includes:

color determining means for determining a color of light indicating the type of the ball identified by the ball identifying mechanism to be emitted by the light-emitting means according to the control program; and light-emitting means driving means for driving the light-emitting means when the ball rolling on the table falls into the opening combined with the light-emitting means such that the light-emitting means emits light in the color determined by the color determining means.

2. A lottery device having a table with a plurality of openings, balls to be rolled on the table, and lottery means for detecting the ball that has fallen into the opening, said lottery device comprising:

a ball dropping mechanism for dropping the ball onto the table;

a ball recovering mechanism for recovering the balls that has fallen into the openings;

a ball identifying mechanism for identifying balls recovered by the ball recovering mechanism by type;

a ball sorting mechanism for sorting the balls identified by the ball identifying mechanism by type and holding the sorted balls;

a ball selecting mechanism for selectively delivering the balls sorted and held by the ball sorting mechanism to the ball dropping mechanism;

ball detecting means combined with the openings, respectively, to provide a detection signal upon detection of the ball that has fallen into the opening;

light-emitting means combined with the openings, respectively, to emit light of different colors;

control means including a storage unit storing control programs and controlling lottery operations according to the control programs;

wherein the control means includes:

color determining means for determining a color indicating the type of the ball identified by the ball identifying mechanism for light to be emitted by the light-emitting means according to the control program;

a ball selecting mechanism operating means for operating the ball selecting mechanism so as to select the ball of a type corresponding to the color determined by the color determining means from the balls sorted and held by the ball sorting mechanism and to deliver the selected ball to the ball dropping mechanism;

a ball dropping mechanism operating means for operating the ball dropping mechanism so as to drop the ball delivered to the ball dropping mechanism onto the table; and light-emitting means operating means for operating the light-emitting means combined with the opening into which the ball has fallen in response to a detection signal provided by the ball detecting means combined with the opening into which the ball has fallen so as to cause the light emitting means to emit light of the determined color.

3. The lottery device according to claim 1 or 2, wherein:

each of the balls is internally provided with an IC tag storing identification information about the type of the ball and is capable of sending and receiving signals by electromagnetic induction; and the ball identifying means is provided with an antenna for sending signals to and receiving signals from the IC tag of the ball and deciphering means for deciphering identification information received through the antenna to discover the type of the ball.

4. The lottery device according to claim 3, wherein the ball identifying mechanism is provided with:

an inclined duct, along which the ball rolls, with which the antenna is combined;

a stopper for temporarily stopping the ball rolling down along the inclined duct near the antenna and for causing the ball to rolling; and stopper driving means for driving the stopper.

5. The lottery device according to claim 3, wherein:

the stopper is a rotating disk provided with a recess for loosely receiving the ball to move the ball; and the stopper driving means is operative to turn the rotating disk about an axis of the rotating disk.

6. The lottery device according to claim 1 or 2, wherein:

each of the balls is made of a transparent or translucent material and has an opaque core;

the ball detecting means includes at least two infrared sensors respectively using infrared rays for detecting the ball that has fallen into the opening; and the infrared sensors are disposed such that the infrared rays travel respectively in different directions across the opening.

7. A lottery device having a table with a plurality of openings, balls to be rolled on the table, and lottery means for detecting the ball that has fallen into the opening, said lottery device comprising:

ball detecting means combined with the openings, respectively, to provide a detection signal upon detection of the ball that has fallen into the opening;

light-emitting means combined with the openings, respectively, to emit light of different colors;

lottery monitoring means for monitoring a state of a lottery game on the basis of results of operation of the ball detecting means;

light-emitting means selecting means for selecting the light-emitting means to emit light according to a specific lottery state;

color determining means for determining a color for light to be emitted according to a specific lottery state; and a light emission control means for causing the light-emitting means selected by the light-emitting means selecting means according to a specific lottery state detected by the lottery state monitoring means to emit light of the color determined by the color determining means in the specific lottery state.

8. The lottery device according to claim 7 further comprising a plurality of lottery game terminals to be operated by a plurality of players simultaneously participating in the lottery game;

wherein the lottery state monitoring means monitors the respective lottery states of the lottery game terminals on the basis of results of detecting operations of the ball detecting means; and the color determining means assigns predetermined colors beforehand to the lottery game terminals, respectively.

9. The lottery device according to claim 7 or 8, wherein the specific lottery state is a state in which the ball is needed to fall into the specific opening; and the light-emitting means selecting means selects the light-emitting means combined with the specific opening in the specific lottery state.

* * * * *